United States Patent
Dell'Aera et al.

(10) Patent No.: US 11,064,332 B2
(45) Date of Patent: Jul. 13, 2021

(54) MACHINE-TO-MACHINE COMMUNICATION OVER A MOBILE COMMUNICATION NETWORK

(71) Applicant: TELECOM ITALIA S.p.A., Milan (IT)

(72) Inventors: Gian Michele Dell'Aera, Turin (IT); Dario Sabella, Gassino Torinese (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/485,690

(22) PCT Filed: Feb. 16, 2018

(86) PCT No.: PCT/EP2018/053858
§ 371 (c)(1),
(2) Date: Aug. 13, 2019

(87) PCT Pub. No.: WO2018/149954
PCT Pub. Date: Aug. 23, 2018

(65) Prior Publication Data
US 2020/0021964 A1     Jan. 16, 2020

(30) Foreign Application Priority Data
Feb. 20, 2017   (IT) .......................... 102017000018570

(51) Int. Cl.
*H04W 4/70*  (2018.01)
*H04W 24/04*  (2009.01)
(Continued)

(52) U.S. Cl.
CPC ............. *H04W 4/70* (2018.02); *H04W 24/04* (2013.01); *H04W 48/18* (2013.01); *H04W 68/02* (2013.01); *H04W 76/27* (2018.02)

(58) Field of Classification Search
CPC ......... H04W 4/00; H04W 4/70; H04W 24/00; H04W 24/02; H04W 24/04;
(Continued)

(56) References Cited

U.S. PATENT DOCUMENTS 9,167,515 B2 * 10/2015 Singh ................ H04W 52/0216
9,344,967 B2 *  5/2016 Lee ..................... H04W 52/028
(Continued)

FOREIGN PATENT DOCUMENTS

CN       102256287 A     11/2011
EP       2 490 474 A1     8/2012

OTHER PUBLICATIONS

International Search Report dated Mar. 26, 2019 in PCT/EP2018/053858, citing documents AA-AC and AO-AP therein, 3 pages.
(Continued)

*Primary Examiner* — Tri H Phan
(74) *Attorney, Agent, or Firm* — Oblon, McClelland, Maier & Neustadt, L.L.P.

(57) ABSTRACT

It is disclosed a method for supporting a machine-to-machine communication over a mobile communication network. The communication involves machine-to-machine devices that connect to the mobile communication network through a gateway including a transceiver module to connect to the mobile communication network over a radio link. The method includes determining whether a radio carrier is present over the radio link, and in the absence of the radio carrier, switching off the transceiver module for a first time period. After the first time period elapsed, the transceiver module is switched on for a second time period. The method further includes, after the second time period elapsed, repeating steps above. The first time period and the second time period are determined on the basis of a number of parameters whose value depend on at least one set of values (Continued)

provided to the gateway by the mobile communication network.

15 Claims, 2 Drawing Sheets

(51) Int. Cl.
*H04W 48/18* (2009.01)
*H04W 68/02* (2009.01)
*H04W 76/27* (2018.01)

(58) Field of Classification Search
CPC ......... H04W 28/0215; H04W 28/0221; H04W 48/18; H04W 52/0225; H04W 52/0241; H04W 52/0274; H04W 52/028; H04W 52/44; H04W 68/00; H04W 68/02; H04W 72/048; H04W 76/27; H04W 76/28
See application file for complete search history.

(56) References Cited

U.S. PATENT DOCUMENTS

| | | | |
|---|---|---|---|
| 9,363,103 B2* | 6/2016 | Chowdhury | H04W 52/02 |
| 9,749,950 B2* | 8/2017 | Li | H04W 8/005 |
| 9,763,172 B2* | 9/2017 | Vajapeyam | H04W 76/28 |
| 9,998,991 B2* | 6/2018 | Sachs | H04W 52/0229 |
| 10,285,129 B2* | 5/2019 | Song | G06F 1/3206 |
| 2010/0173628 A1 | 7/2010 | Hosain et al. | |
| 2012/0230286 A1 | 9/2012 | Nishida et al. | |
| 2012/0263110 A1 | 10/2012 | Nishida et al. | |
| 2019/0327679 A1* | 10/2019 | Gupta | H04W 52/0229 |

OTHER PUBLICATIONS

"LTE; Evolved Universal Terrestrial Radio Access (E-UTRA); User Equipment (UE) procedures in idle mode (3GPP TS 36.304 version 13.1.0 Release 1 3)" ETSI TS 136 304 V13.1.0, 2016, 6 pages.
Jha, S.C. et al. "Power Saving mechanisms for M2M communication over LTE networks" 2013 First International Black Sea Conference on Communications and Networking (BlackSeaCom), 2013, 5 pages.
Chiaraviglio, L. et al. "Energy-Aware UMTS Access Networks" The 11$^{th}$ International Symposium on Wireless Personal Multimedia Communications (WPMC'08), 2008, 5 pages.
"LTE; Evolved Universal Terrestrial Radio Access (E-UTRA); Radio Resource Control (RRC); Protocol specification (3GPP TS 36.331 version 13.1.0 Release 1 3)" ETSI TS 136 331 V13.1.0, 2016, 19 pages.

* cited by examiner

MACHINE-TO-MACHINE COMMUNICATION OVER A MOBILE COMMUNICATION NETWORK

TECHNICAL FIELD

The present invention relates to the field of mobile communication networks. In particular, the present invention relates to a method and system for supporting M2M (machine-to-machine) communication over a mobile communication network.

BACKGROUND ART

As known, machine-to-machine communication (M2M), or machine-type communication (MTC), relates to automated data communications among devices to provide services typically based on data made available by these devices. M2M communications are typically established within sensor networks such as temperature sensors, humidity sensors, $CO_2$ sensors, light intensity sensors, and so on. M2M services comprise metering services (electric power, gas, water), home automation, payment services, surveillance services, access control. The communication among M2M devices may be handled through different network technologies as devices may be connected one to another through wired or wireless networks. Generally, an M2M device communicates with a remote application server through the Internet and is hence provided with Internet access. To this aim, M2M devices are registered to a mobile communication network, such as an LTE (Long Term Evolution) network, and may connect to the radio access network of the mobile communication network directly or through gateways.

M2M devices are typically equipped with batteries. Moreover, they may be possibly located in remote positions, so they are expected to operate for long periods of time without the need to replace the batteries. Therefore, M2M devices generally have stringent constraints on their power consumption.

In LTE networks, discontinuous reception (DRX) may be used to decrease the power consumption of an LTE terminal device by allowing it to turn receiver circuitry momentarily off, when in idle state, as described in ETSI TS 136 304 V13.1.0 (2016, 16 Apr.), "LTE; Evolved Universal Terrestrial Radio Access (E-UTRA); User Equipment (UE) procedures in idle mode", chapter 7.

As known, an M2M device registered to the LTE network, at radio resource control (RRC) level, may be in one of two states, namely the connected state and the idle state. The connected state is the state where the device transmits and receives data. When the M2M device has no data activity for a given period, the LTE network sends the M2M device to its idle state, which is less power consuming. In idle state, the device sleeps most of the time and wakes up periodically (in correspondence of the so called "paging occasions") to listen to paging messages broadcast by the LTE network for checking for packets and/or possible system information change notifications. This period is called paging cycle. S. C. Jha, A. T. Koc, M. Gupta and R. Vannithamby, "Power Saving mechanisms for M2M communication over LTE networks," Communications and Networking (BlackSea-Com), 2013 First International Black Sea Conference on, Batumi, 2013, pp. 102-106, discloses a mechanism for saving power according to which the time that the M2M device is in low power state is maximized, by extending the paging cycle and reducing the RRC connected-to-idle transition tail time.

On the other hand, it is known that the costs related to the power consumption of a mobile communication network, such as an LTE network, have a huge economic impact on the revenues of a network operator. Therefore, network operators are implementing energy efficient techniques for saving power within their networks, such as the known selective on-off cell switching scheme. This scheme provides for switching on and off a base station of the mobile communication network depending on the cell traffic load: for instance, the base station may be switched off when the number of UEs inside the cell goes below a predefined threshold or during the night hours. An energy efficient technique comprising reducing the number of active access devices when traffic is low is disclosed, for instance, in L. Chiaraviglio et al., "Energy-aware UMTS access networks", The 11th International Symposium on Wireless Personal Multimedia Communication (WPMC'08), Sep. 8-11, 2008, Lapland (Finland).

SUMMARY OF THE INVENTION

The inventors have noticed that current mobile communication networks are not optimized for interoperation with M2M communications. Indeed, M2M communications typically have different traffic characteristics with respect to human-to-human (H2H) communications that are typically handled in a mobile communication network. While H2H communication is generally characterized by frequent transmission of data in both downlink and uplink during daily hours, M2M communication typically involves more rare data transmissions mainly on uplink and possibly during the night.

In light of the above, implementation of energy efficient techniques for saving power within the mobile communication network shall take into account the differences outlined above. Indeed, in case the on-off scheme is applied for the selective cell switching as an energy efficient technique in a mobile communication network, an M2M communication provided over the mobile communication network may be disadvantageously impaired. As a matter of fact, the radio link connecting the M2M device and the mobile communication network may be temporarily unavailable when the cell is switched off (e.g. during some hours in the night), so that data losses and delays may occur in case the M2M communication is foreseen when a cell is switched off. Moreover, as the interoperation between the mobile communication network and the M2M devices is not optimized, power wastages are foreseen in the M2M devices, as they try to connect to the mobile communication network even when the relevant cell is switched off.

In view of the above, the Applicant has tackled the problem of providing a method for supporting M2M communication over a mobile communication network which allows avoiding impairments on the M2M communication over a mobile communication network when energy efficient techniques are applied in the mobile communication network. In particular, the Applicant has tackled the problem of providing a method for supporting M2M communication for providing a M2M service over a mobile communication network which allows minimizing the power consumption of both the M2M devices and the mobile communication network, while keeping the M2M service active.

According to a first aspect, the present invention provides a method for supporting a machine-to-machine communication over a mobile communication network, the machine-to-machine communication involving machine-to-machine devices suitable for being connected to the mobile communication network through a gateway comprising a transceiver module configured to connect to the mobile communication network over a radio link, the method comprising:

a) determining whether a radio carrier is present over the radio link;
b) in the absence of the radio carrier, switching off the transceiver module for a first time period; and
c) after the first time period, elapsed, switching on the transceiver module for a second time period, the method further comprising, after the second time period, elapsed, repeating steps a) to c), wherein the first time period and the second time period are determined on the basis of a number of parameters whose value depend on at least one set of values provided to the gateway by the mobile communication network.

Preferably, the first time period, is equal to T·2N, where T is a first parameter of the number of parameters, and N is an integer index having a value in an interval ranging from a starting value, Ns, and a maximum value, Nmax, wherein the starting value, Ns, is an integer number equal to or higher than 0, and the maximum value, Nmax, is an integer value equal to or higher than 1, and wherein the second time period is a second parameter of the number of parameters whose value depend on at least one set of values provided to the gateway by the mobile communication network.

Preferably, the method further comprises incrementing by one the value of the integer index, N, at each repetition of steps a) to c) after the second time period elapsed.

Preferably, the method further comprises, at each repetition of steps a) to c), after the second time period, T2, elapsed, updating the first time period, T1, according to the following equation:

$$T1=\min(T \cdot 2^N, T1\ max),$$

where T is the first parameter, N is the integer index and T1 max is a third parameter of the number of parameters whose value depend on at least one set of values is provided to the gateway by the mobile communication network.

Preferably, the method further comprises determining the maximum value, Nmax, according to the following equation:

$$N\ max=\text{ceiling}\ (\log 2(T1\ max/T)),$$

where T1 max is the third parameter and T is the first parameter.

Preferably, the method further comprises selecting the value of each parameter of the number of parameters as a maximum value among respective corresponding values of the at least one set of values provided to the gateway by the mobile communication network.

According to an embodiment of the present invention, the at least one set of values of the number of parameters are provided to the gateway by means of signaling over the radio link.

Preferably, the mobile communication network is a LTE network and the at least one set of values of the number of parameters are provided to the gateway in a system information block broadcast by the LTE network.

Preferably, the method comprises providing the gateway with an indication of a time at which the absence of the radio carrier over the radio link is expected.

Preferably, the method comprises providing the gateway with an indication of a duration of a time interval during which the absence of the radio carrier over the radio link is expected.

Preferably, the method further comprises broadcasting the indication in a paging message with a specific identifier and delivered to the gateway at a paging occasion.

According to another embodiment of the present invention, the method further comprises transmitting the at least one set of values of the number of parameters by the mobile communication network to a server via a data communication network, and reading, by the gateway, the at least one set of values from the server.

Preferably, the data communication network is a TCP/IP network, transmitting the at least one set of values to the server comprises transmitting the at least one set of values to the server in HTTP messages over the TCP/IP network, and reading comprises initiating by the gateway a communication session with the server via HTTP messages though the mobile communication network.

According to a second aspect, the present invention provides a gateway configured to connect to a mobile communication network machine-to-machine devices involved in a machine-to-machine communication, the gateway comprising a transceiver module configured to connect to the mobile communication network over a radio link, the gateway being further configured to:

a) determine whether a radio carrier is present over the radio link;
b) in the absence of the radio carrier, switch off the transceiver module for a first time period; and
c) after the first time period, elapsed, switch on the transceiver module for a second time period, the gateway being further configured to, after the second time period elapsed, repeat steps a) to c), and to determine the first time period and the second time period on the basis of a number of parameters whose value depend on at least one set of values provided to the gateway by the mobile communication network.

According to a third aspect, the present invention provides a system comprising a mobile communication network, a number of machine-to-machine devices and a gateway configured to connect the machine-to-machine devices to the mobile communication network, the gateway being as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
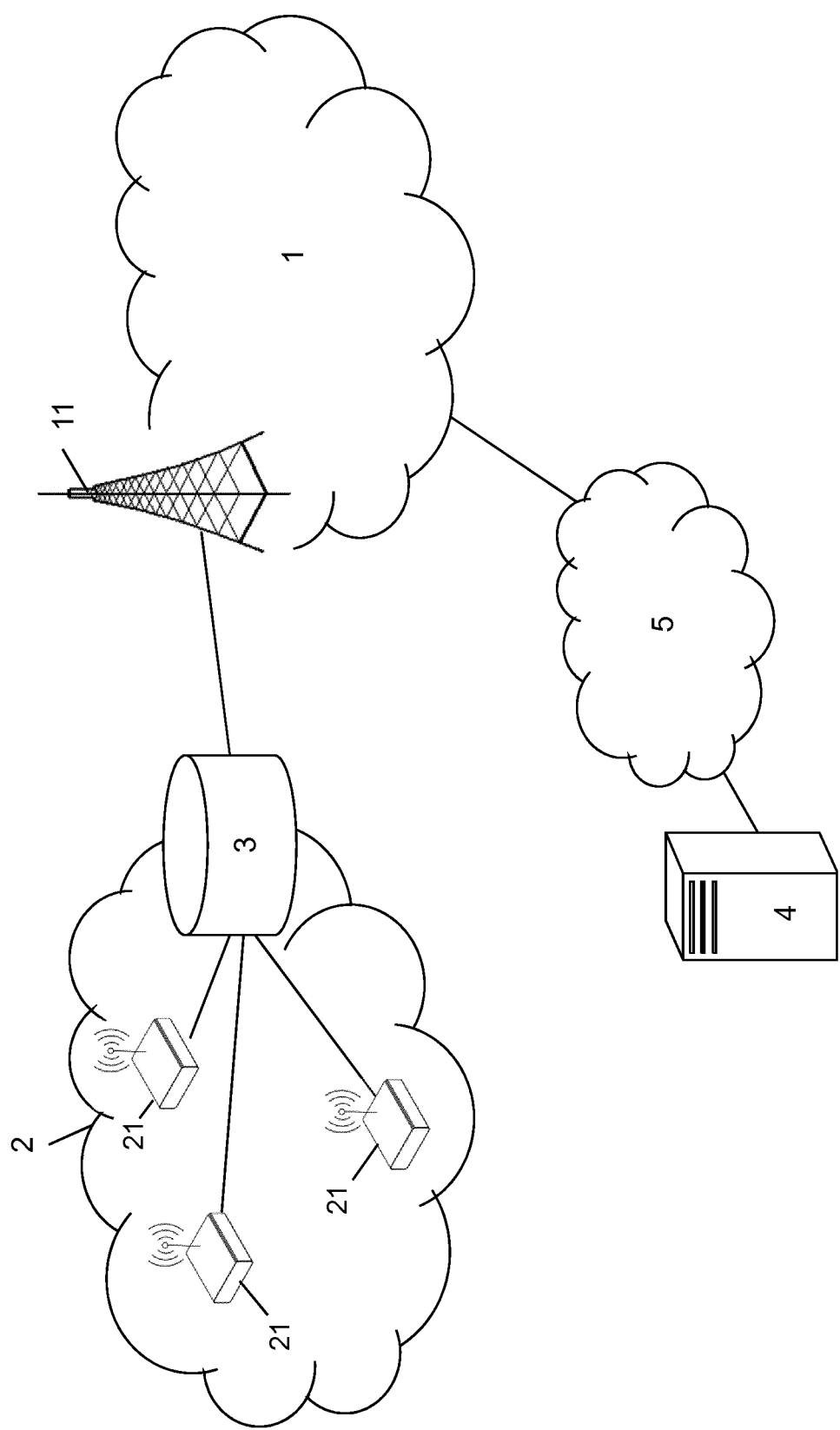
FIG. 1 schematically shows a system implementing the method according to the present invention.

FIG. 1 schematically shows a system implementing the method according to the present invention.

The system comprises a mobile communication network 1 and a network 2 of machine-to-machine (M2M) devices 21 (M2M network). The mobile communication network 1 preferably comprises a radio access network comprising at least one base station 11, and a core network (not shown in the drawings). The mobile communication network 1 may be a 3GPP long term evolution (LTE) network comprising an evolved universal terrestrial radio access network (E-UTRAN) with an eNodeB 11. It is assumed that the base station 11 shown in FIG. 1 serves a number of user equipment (UEs) located in a given cell, which are not shown in the drawings.

Moreover, it is assumed that the base station 11 broadcasts a set of system information comprising relevant information for the UEs of the mobile communication network 1 such as cell access related parameters, cell re-selection related parameters, etc. In an LTE network, this information is carried in the so-called system information blocks (SIBs) and broadcasted by the eNodeB over logical channel BCCH (broadcast control channel) mapped on transport channel DL-SCH (downlink shared channel) which is in turn mapped on physical channel PDSCH (physical downlink shared channel). Besides that, the eNodeB 11 uses a paging procedure to, for instance, inform a user equipment about a change of system information. Paging is broadcast over logical channel PCCH (paging control channel) mapped on transport channel PCH (paging channel) which is in turn mapped on physical channel PDSCH. The paging procedure comprises sending paging messages to the user equipment at the so-called "paging occasions". Paging occasions have a given periodicity, the paging cycle, which is specified to the user equipment in the system information. The system information and paging procedures within an LTE network are described in 3GPP TS 36.331 version 13.1.0 Release 13, "LTE; Evolved Universal Terrestrial Radio Access (E-UTRA); Radio Resource Control (RRC); Protocol specification", chapter 5.2 and 5.3.2 and will not be described in greater detail herein after.

The M2M devices 21 may be sensors deployed in a given outdoor and/or indoor environment for providing a M2M service such as a metering service or a remote control service. They may be connected to a base station 11 over radio links of the mobile communication network 1 via one or more gateways 3 that may be independent devices with respect to the M2M devices 21. Alternatively, the functionalities of the gateway may be integrated in the M2M devices 21. In the exemplary M2M network 2 of FIG. 1, the M2M devices 21 are connected to the mobile communication network 1 through an external gateway 3. Within the M2M network 2, the M2M devices 21 may be connected one to another through wired or wireless connections according to any available wireless network technology (e.g. Wi-Fi, ZigBee, Bluetooth, LTE). Analogously, each M2M device 21 may be connected to the gateway 3 through a wired or a wireless connection according to any available wireless network technology (e.g. Wi-Fi, ZigBee, Bluetooth, LTE). In turn, the gateway 3 preferably comprises a radio transceiver module (namely, a modem) through which it is preferably connected to the base station 11 over a given radio link, and hence it is configured to operate as a user equipment in the mobile communication network 1. For instance, the gateway 3 may be an LTE router and may comprise a transceiver module implementing an E-UTRA interface for connecting to the eNodeB 11. Moreover, the gateway 3 preferably comprises a processor.

As already mentioned above, it is to be noticed that the presence of the independent gateway 3 in FIG. 1 is merely exemplary and is not limiting, as the method of the present invention may be applied also to a system wherein the M2M devices are directly connected to the mobile communication network 1 and are provided with a radio transceiver module and processing capabilities.

The system then preferably comprises one or more M2M servers 4 configured to manage the M2M service by exchanging data with the M2M devices 21. The M2M servers 4 are preferably application servers connected to the core network of the mobile communication network 1 via a data communication network 5, e.g. a TCP/IP network. In particular, the M2M server 4 hosts a M2M application (in particular, a web application) related to the M2M service.

It is assumed that in the mobile communication network 1 the radio link between the gateway 3 and the mobile communication network 1 may be selectively inactive (i.e. a radio carrier may be selectively present over the radio link). In particular, the mobile communication network 1 may be operated according to an energy efficient technique adopting, for instance, an on-off cell switching scheme. According to this scheme, the base station 11 (or, equivalently, the cell) is selectively switched on and off depending on the traffic load conditions of the served cell. The energy efficient techniques that may be adopted are not relevant to the present description and hence they will not be further described herein after.

According to the method to the present invention, when it is detected the absence of a radio carrier on the radio link between the gateway 3 and the base station 11, because, for instance, the cell is switched off for energy saving purposes, an adaptive algorithm is triggered in the gateway 3, which decreases the usage of the radio link in order to avoid energy wastages. The usage of the radio link may progressively decrease so as to optimize the power saving. On the other hand, when the presence of a radio carrier is detected over the radio link, because, for instance, the cell is switched on, the usage of the radio link is re-established, so that a proper connectivity between the gateway 3 and the base station 11 is guaranteed. In this way, the energy consumption of both the gateway 3 and the base station 11 is minimized while keeping active the M2M service. The adaptive algorithm is configured in the gateway 3 by a gateway set up that may be performed according to two different embodiments of the present invention, which will be described in detail herein after. The set up of the gateway preferably comprises providing the processor of the gateway 3 with at least one set of values for configuring a number of parameters for operating the gateway 3 to execute the algorithm. The at least one set of values for configuring the parameters is provided by the mobile communication network 1 according to different embodiments of the present invention.

Figure 2:
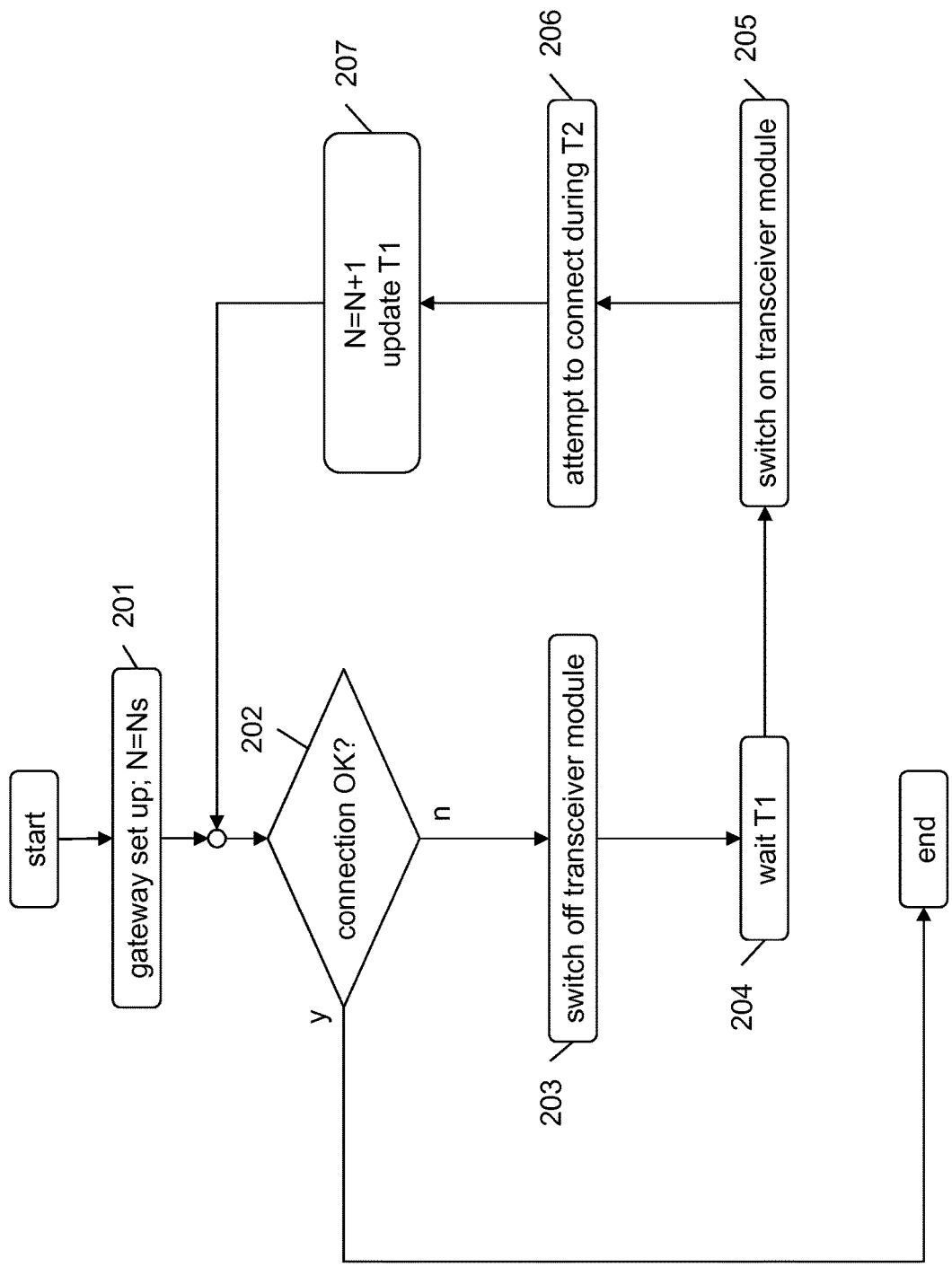
FIG. 2 is a flowchart illustrating the steps of the method according to the present invention.

In the following description, the method above will be described in greater detail, with reference to the flowchart of FIG. 2. The flow chart of FIG. 2 illustrates the operation of the gateway 3 when implementing the algorithm cited above for decreasing the usage of the radio link in order to avoid energy wastages.

According to the present invention, a gateway set up is carried out at step 201, which will be described in detail herein after. During the set up, an integer index N is initialized to a starting value Ns. The starting value may be equal to 0. According to the present invention, the integer index N may then take a value within the range $\{0, 1, 2, \ldots, Nmax\}$, where Nmax is a maximum integer value which will be specified herein after.

Then, during the normal operation of the gateway 3, the gateway 3 preferably attempts to connect to the base station 11. Typically, the gateway 3 may attempt to connect to the base station 11 when data from the M2M devices are collected and ready to be sent to the M2M server 4. Every time the gateway 3 attempts to connect to the base station 11, a check is performed in order to determine whether a radio carrier is present over the radio link (step 202). In case no radio carrier is detected over the radio link, the transceiver module of the gateway 3 is preferably switched off (step 203). At step 204, the transceiver module of the gateway 3 is preferably kept switched off for a first time period equal to T1 (which will be referred to in the following description as "sleep period T1"), wherein:

$$T1 = T \cdot 2^N \quad [1]$$

where T is a first parameter of the adaptive algorithm taking a pre-determined value, for instance 60 sec.

After the sleep period T1 elapsed, the transceiver module of the gateway 3 is preferably switched on (step 205). Then, for a second time period equal to T2 (which will be referred to in the following description as "wakeup period T2"), the gateway 3 preferably attempts to connect again to the base station 11 (step 206). The wakeup period T2 is preferably a second parameter of the adaptive algorithm taking a pre-determined value, for instance 180 sec.

In the meanwhile, at step 207, the processor of the gateway 3 preferably increments the integer index N by one and updates the sleep period T1. The update of the sleep period T1 is preferably performed according to the following equation:

$$T1 = \min(T \cdot 2^N, T1\ \max) \quad [2]$$

where T1 max is a maximum sleep period. The maximum sleep period T1 max is a third parameter of the adaptive algorithm taking a pre-determined value, equal to, for instance, 3 hours. Moreover the maximum sleep period T1 max may be expressed as a function of the first parameter of the adaptive algorithm T and the maximum value that index N may take, Nmax, according to the following equation:

$$T1\ \max = T \cdot 2^{Nmax}. \quad [3]$$

Therefore, according to equation [3], the maximum value Nmax of the integer index N is preferably determined by the processor of the gateway 3 on the basis of the values of the maximum sleep period T1 max and the first parameter T, as:

$$N\ \max = \text{ceiling }(\log_2(T1\ \max/T)), \quad [4]$$

where ceiling(x)=⌈x⌉ indicates the smallest integer greater than or equal to the argument.

When the gateway 3 attempts to connect again to the base station 11, the check at step 202 is preferably repeated. If no radio carrier is detected over the radio link, the transceiver module of the gateway 3 is preferably switched off again (step 203). Then, steps 204-207 are preferably repeated. Indeed, steps 202-207 are cyclically repeated until at step 202 a radio carrier is detected over the radio link (because, for instance, the cell is switched on).

When, at step 202, a radio carrier is detected over the radio link, the gateway 3 may establish a connection with the base station 11 for connecting to the mobile communication network 1 (step not shown in the flowchart of FIG. 2). In this case, the integer index N is preferably decreased according to the following rule:

$$N = \max(N-K, Ns)$$

where K is an integer number higher than 1, which represents the speed at which the gateway 3 returns to the starting point of the method according to the present invention. For instance, K may be equal to 3. Also in case the radio link is active, the check of step 202 is repeated periodically and, if at each repetition the radio carrier continues to be detected over the radio link, the integer index N is decremented by K until it reaches the starting value Ns. In case at step 202 no radio carrier is detected over the radio link, steps 203-207 are performed again and possibly cyclically repeated as already described above.

At each repetition cycle of steps 202-207, while the wake up period T2 is kept fixed to its pre-determined value, the sleep period T1 is longer than during the previous cycle, up to a threshold value T1 max, due to the update operation carried out at step 207, as the index N is incremented by one at each cycle. Therefore, at each repetition cycle of the described algorithm, the gateway 3 progressively keeps its transceiver module switched off for a longer period of time and hence progressively decreases the usage of the radio link, thus resulting in reducing the power wastage.

Alternatively, according to a variant of the method described above, the sleep period T1 may be kept fixed to a pre-determined value. This means that, according to this variant, the sleep period T1 is not updated at each repetition cycle (and hence step 207 is not performed) but it takes the same value over all cycles of repetition of the steps described above. The inventors noticed that, in this case, a small value of the sleep period T1 allows implementing a more reactive M2M system, but may increase the power consumption. On the other hand, a higher value of the sleep period T1 allows a higher power saving but it reduces the system reactivity. The sleep period T1 may have a fixed value ranging between, for instance, tens of seconds and a few minutes.

The wake up period T2 determines the duration of the transceiver module switch on, in the absence of a radio carrier over the radio link towards the base station 11. As cited above, it may take the pre-determined value of 180 sec. The inventors noticed that the value of the wake up period T2 may depend on two aspects: the first aspect is the capability of the gateway 3 to verify the presence/absence of a radio carrier over the radio link, and the second aspect is the probability of collision or failure when the gateway 3 connects to the mobile communication network 1. Indeed, a high value of the wake up period T2 reduces the capability of saving power but in any case the wake up period T2 shall be long enough to guarantee that the presence/absence of the radio carrier is correctly detected. In case a too small value is selected for the wake up period T2, the radio interface of the gateway 3 may switch off before the correct conclusion of the procedure of connection attempt and the check at step 202 may not be correctly carried out. In view of the above, the value of 180 sec has been identified by the inventors on the basis of tests they have made regarding times of completion of the procedures mentioned above (e.g. connection attempt to the base station 11).

According to an embodiment of the present invention, the gateway set up of step 201 comprise configuring in the gateway 3 the parameters mentioned above, namely the first time parameter T, the second time parameter T2, and the third time parameter T1 max. Configuring the parameters comprises setting a value for each of these parameters in order to perform the steps of the algorithm described above and illustrated in FIG. 2.

According to embodiments of the present invention, configuring the parameters of the adaptive algorithm comprises selecting the values of the parameters to be used on the basis of at least one set of pre-determined values, which are determined by the network operator and communicated to the gateway 3 through the mobile communication network 1. In particular, according to an embodiment, the gateway 3 may be provided with one set of pre-determined values for configuring the parameters, and in this case the parameters in the gateway 3 are configured with those received values.

The gateway 3 may also be provided with two sets of pre-determined values for configuring the parameters, and in this case, preferably, each parameter is configured with a value corresponding to the maximum value between the respective corresponding values of the different sets for the considered parameter. As an example, it is assumed that the gateway 3 is provided with a first set of pre-determined values for the parameters and a second set of pre-determined values. The first values may be "user-specific" values, namely specific for the considered gateway 3. They will be indicated as: T_ue, T1_ue, T1 max_ue. The second values may be "cell-specific", namely they may be used by all the gateways 3 located in a same cell of the mobile communication 1 (i.e. served by the same base station 11), and will be indicated as: T_ce, T1_ce, T1 max_ce. According to this embodiment of the present invention, in this exemplary case, the parameters T, T1 and T1 max are configured as follows:

$T=\max(T\_ue, T\_ce);$ $T1=\max(T1\_ue, T1\_ce);$ $T1\ \max=\max(T1\ \max\_ue, T1\ \max\_ce).$ The at least one set of pre-determined values for configuring the parameters of the adaptive algorithm are preferably communicated to the gateway 3 by the mobile communication network 1 according to two different embodiments of the present invention.

According to a first embodiment of the present invention, the at least one set of values used for configuring the parameters as described above (namely, for instance, the "user-specific" values and the "cell-specific" values described above) are provided to the gateway 3 by means of signaling, the signaling taking place over the radio link between the gateway 3 and the base station 11. In particular, according to this first embodiment, the values used for configuring the parameters are provided to the gateway 3 by the base station 11 in the system information that the mobile communication network 1 broadcasts for the user equipment registered to the mobile communication network 1. Moreover, the base station 11 preferably also signals to the gateway 3 when the radio link is going to become inactive, thus indicating when the absence of a radio carrier over the radio link between the gateway 3 and the base station 11 is expected, because, for instance, the cell is going to switch off. In this case, this signaling is preferably performed by broadcasting an indication of a time at which a cell switch off is expected (namely, the next cell switch off with respect to the moment at which the signaling is broadcast). Optionally, the base station 11 may signal to the gateway 3 an indication of a duration of the time interval during which the radio link is inactive, because of, for instance, the cell switch off. This indication may be given to the gateway 3 in the form of an index value, different from 0, that may be used by the processor of the gateway 3 as the value for the integer index N used to compute the sleep period T1, according to the variant cited above providing a fixed duration sleep period T1. In this case, the transceiver module of the gateway 3 is switched off for a sleep period T1 which substantially corresponds to the duration of the cell switch off.

For sake of simplicity, in the following description related to this first embodiment of the present invention, reference will be made to the exemplary LTE network cited above, and the related terminology will be used. Moreover, for sake of not limiting example, reference will be made to cell switch off as causing the absence of the radio carrier over the radio link between the gateway 3 and the base station 11. In the exemplary LTE network, the values used for configuring the parameters of the adaptive algorithm are preferably transmitted in a specific SIB, which is broadcast by the eNodeB 11 within the relevant cell with a given periodicity. In particular, the values used for configuring the parameters are preferably carried in a dedicated SIB, which will be referred to in the following description as "M2M SIB". More in particular, according to the first embodiment of the present invention, the values used for configuring the parameters are signaled by the eNodeB 11 to the gateway 3 by broadcasting them in the M2M SIB with a pre-determined scheduling within the sub-frames of the radio frames and a given period of repetition. The period of repetition of the M2M SIB in the radio frames may be equal to few hundreds of milliseconds. In this way, the values used for configuring the parameters may be periodically adapted to the network conditions, which comprise an amount of machine-to-machine traffic and a number of devices connected to the network.

Moreover, the eNodeB 11 may signal the time at which the next cell switch off is expected by broadcasting the indication about this cell switch off time in a paging message with a specific identifier, which may be referred to as "off radio network temporal identifier" (OFF-RNTI). The paging message is delivered to the gateway 3 at a paging occasion. The period of repetition of the paging occasions is the paging cycle, which may correspond to {32, 64, 128, 256} radio frames, where a radio frame duration is equal to 10 ms.

According to the first embodiment of the present invention, the period of repetition of the M2M SIB in the radio frames is preferably shorter than the paging cycle.

Furthermore, the indication of a duration of the cell switch off, in terms of a fixed value for the index N, may be signaled in a specific downlink control information or in a SIB, transmitted in the same sub-frame of the relevant paging occasion. For instance, the indication of a duration of the cell switch off may be signalled in the M2M SIB already cited above.

According to the first embodiment of the present invention, the gateway 3 may read the values for the first, second and third parameters T, T1 max and T2 in the M2M SIBs broadcasted by the eNodeB 11, and preferably configures the parameters by using these values in order to perform the algorithm of FIG. 2. In particular, if one set of values is transmitted, the gateway 3 preferably configures the parameters with the values of the transmitted set. If two sets of values are transmitted (e.g. "user-specific" values and "cell-specific" values), the gateway 3 preferably configures each parameter with the maximum value between the respective corresponding values of the transmitted sets.

Moreover, when the gateway 3, at a given paging occasion, identifies the OFF-RNTI, the gateway 3 preferably determines that the cell is in the proximity of a switch off. In particular, the gateway 3, once it has identified a OFF-RNTI in a paging message, determines that the cell will be switched off before the next paging occasion and hence it may switch off its transceiver module, possibly without checking whether there is a radio carrier over the radio link, and start applying the steps described above.

As far as the sleep period T1 is concerned, according to the description above, it may be progressively increased during the repetition cycles of the algorithm described above or it may have a fixed value. In this latter case, the network operator may provide, in a specific downlink control information or in the M2M SIB, the value of the index N that may be used by the gateway processor to compute the sleep period T1 and that corresponds to an expected duration of the cell switch off. In particular, this value of the index N may be signaled in the next M2M SIB after identification of the OFF-RNTI. It is to be noticed that this value is merely indicative of the expected cell switch off duration, which however may be not actually implemented by the mobile communication network 1. In this case, the gateway 3, upon reception of the fixed value of the index N, may, on the basis of the expected cell switch off duration and on the basis of the traffic load it has to handle, determine to switch off the transceiver module or to start a cell re-selection procedure.

According to a second embodiment of the present invention, the values used to configure the parameters of the adaptive algorithm of FIG. 2 are transmitted by the mobile communication network 1 to the M2M server 4 via the data communication network 5, which is, e.g., a TCP/IP network. For instance, the values of the parameters may be transmitted in HTTP messages over the TCP/IP network 5. The values of the parameters may be stored in a data repository or database (not shown in the drawings) hosted by the M2M server or connected to it. For instance, the values of the parameters may be stored in a text file of the filesystem of the M2M server 4.

The values of the parameters stored in the M2M server may be read by the gateway 3 in an asynchronous mode. According to this second embodiment of the present invention, the gateway 3 may initiate a communication session (via e.g. HTTP messages) with the M2M server 4, through the mobile communication network 1, to read the values of the parameters. Alternatively, the M2M application residing on the M2M server 4 may initiate a communication session (via, e.g., HTTP messages) with the gateway 3 and trigger the operation of reading the values of the parameters by the gateway 3. This second option may be considered when a triggering of the gateway 3 is needed because, e.g., the network operator changed the policies of cell switch off and new values of the parameters need to be communicated to the gateway 3 without delay.

According to the second embodiment of the present invention, once the gateway 3 read the values for the first, second and third parameters T, T1 max and T2 from the M2M server, it preferably configures the parameters by using these values in order to perform the algorithm of FIG. 2. In particular, if one set of values is stored in the M2M server, the gateway 3 preferably configures the parameters with the values of the stored set. If two sets of values are stored in the M2M server (e.g. "user-specific" values and "cell-specific" values), the gateway 3 preferably configures each parameter with the maximum value between the respective corresponding values of the stored sets.

The method according to the present invention advantageously allows avoiding impairments on the M2M communication over the mobile communication network when energy efficient techniques are applied. In particular, the method allows minimizing the power consumption of both the M2M devices and the mobile communication network, while keeping active the M2M service: indeed, it allows implementing an on-off cell switching scheme which minimizes the energy consumption of the base station, and at the same time it provides an adaptive algorithm that allows minimizing the energy consumption of the M2M device, in presence of such an on-off cell switching scheme. The configuration of the parameters for the algorithm may be conveniently performed according to two different embodiments: either the set up is done by a proper radio set up of the M2M device directly from the base station, or by a proper TCP/IP signaling via the M2M remote application server. The former set up is advantageously efficient as it allows adapting the parameters to the network conditions. This set up is also highly reliable and allows to minimize latency, thanks to the fact that it involves a direct communication via a radio interface. The latter set up advantageously does not require any modification in the signaling over the radio link between the M2M device and the base station.

The invention claimed is:

1. A method for supporting a machine-to-machine communication over a mobile communication network, said machine-to-machine communication involving machine-to-machine devices configured to be connected to the mobile communication network through a gateway comprising a transceiver module configured to connect to said mobile communication network over a radio link, said method comprising:
   a) determining whether a radio carrier is present over said radio link;
   b) in the absence of said radio carrier, switching off said transceiver module for a first time period; and
   c) after said first time period, elapsed, switching on said transceiver module for a second time period,
   said method further comprising, after said second time period elapsed, repeating said steps a) to c),
   wherein said first time period and said second time period are determined on the basis of a number of parameters that depend on at least one set of predetermined values provided to the gateway by the mobile communication network, the number of parameters including a first parameter and a second parameter, each one of the first parameter and said second parameter taking a respective predetermined value, and said first time period depends on said first parameter and said second time period depends on said second parameter.

2. The method according to claim 1, wherein said first time period is equal to $T \cdot 2^N$, where T is said first parameter of said number of parameters, and N is an integer index having a value in an interval ranging from a starting value, Ns, and a maximum value, Nmax, wherein said starting value, Ns, is an integer number equal to or higher than 0, and said maximum value, Nmax, is an integer value equal to or higher than 1.

3. The method according to claim 2, further comprising incrementing said integer index, N, by one at each of said repetition of steps a) to c) after said second time period, elapsed.

4. The method according to claim 3, further comprising, at each of said repetition of steps a) to c), after said second time period, T2, elapsed, updating said first time period, T1, according to:

$$T1 = \min(T \cdot 2^N, T1 \text{ max}),$$

where T is said first parameter, N is said integer index and T1max is a third parameter of said number of parameters that depend on at least one set of values is provided to the gateway by the mobile communication network.

5. The method according to claim 4, further comprising determining said maximum value, Nmax, according to:

$$N \text{ max} = \text{ceiling } (\log 2(T1 \text{ max}/T))$$

where T1max is said third parameter and T is said first parameter.

6. The method according to claim 1, further comprising selecting of each parameter of said number of parameters as a maximum among respective corresponding values of said at least one set of values provided to the gateway by the mobile communication network.

7. The method according to claim 1, wherein said at least one set of predetermined values are provided to the gateway via signaling over said radio link.

8. The method according to claim 7, wherein said mobile communication network is a LTE network and said at least one set of predetermined values are provided to the gateway in a system information block broadcast by said LTE network.

9. The method according to claim 8, further comprising broadcasting said indication in a paging message with a specific identifier and delivered to said gateway at a paging occasion.

10. The method according to claim 1, further comprising providing said gateway with an indication of a time at which said absence of said radio carrier over said radio link is expected.

11. The method according to claim 10, further comprising providing said gateway with an indication of a duration of a time interval during which said absence of said radio carrier over said radio link is expected.

12. The method according to claim 1, further comprising transmitting said at least one set of predetermined values by said mobile communication network to a server via a data communication network, and reading, by said gateway, said at least one set of predetermined values from said server.

13. The method according to claim 12, wherein said data communication network is a TCP/IP network, said transmitting said at least one set of predetermined values to said server comprises transmitting said at least one set of predetermined values to said server in HTTP messages over said TCP/IP network, and said reading comprises initiating by said gateway a communication session with said server via HTTP messages though said mobile communication network.

14. A gateway configured to connect to a mobile communication network machine-to-machine devices involved in a machine-to-machine communication, said gateway comprising a transceiver module configured to connect to said mobile communication network over a radio link, said gateway being further configured to:
   a) determine whether a radio carrier is present over said radio link;
   b) in the absence of said radio carrier, switch off said transceiver module for a first time period; and
   c) after said first time period, elapsed, switch on said transceiver module for a second time period,
   said gateway being further configured to, after said second time period elapsed, repeat said steps a) to c), to determine said first time period and said second time period on the basis of a number of parameters that depend on at least one set of predetermined values provided to the gateway by the mobile communication network, the number of parameters including a first parameter and a second parameter, each one of the first parameter and said second parameter taking a respective predetermined value, and said first time period depends on said first parameter and said second time period depends on said second parameter.

15. A system comprising a mobile communication network, a number of machine-to-machine devices and a gateway configured to connect said machine-to-machine devices to said mobile communication network the gateway being according to claim 14.

* * * * *